United States Patent Office 3,585,214
Patented June 15, 1971

3,585,214
HYDROXYL DERIVATIVES OF COUMARINE AND
PROCESSES FOR THE PREPARATION THEREOF
Eugene Boschetti, Venissieux, Darius Molho, Boulogne-
sur-Seine, and Louis Fontaine, Lyon, France, assignors
to Lipha, Lyonnaise Industrielle Pharmaceutique
No Drawing. Filed Mar. 15, 1968, Ser. No. 713,316
Claims priority, application France, Mar. 20, 1967,
99,483
Int. Cl. C07d 7/38
U.S. Cl. 260—343.2                                1 Claim

ABSTRACT OF THE DISCLOSURE

This invention discloses a new series of derivatives of coumarine, having strong hypotensive activity, spasmolytic activity on the sphincter of Oddi and choleretic activity, which come within the scope of the formula.

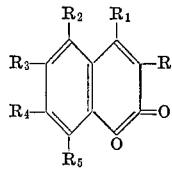

wherein, depending on the compound, R is a hydroxy, alkyl, aralkyl, pyridyl alkyl, aryl or amino radical, $R_1$, $R_2$, $R_3$, $R_4$ and $R_5$ are hydrogen or a hydroxy radical.

---

The present invention relates to new hydroxyl derivatives of coumarine and processes for the preparation thereof.

Coumarine compounds monohydroxylated in different positions on the coumarine nucleus are already known, such as 4-hydroxycoumarine and 7-hydroxycoumarine, which are optionally substituted and of which the choleretic activities have been described in the special French medicament Pats. Nos. 1430 M of July 13, 1961 and 2321 M of Jan. 16, 1962 in the name of the applicants. Certain 4-hydroxycoumarines substituted in the 3-position are endowed with strong anticoagulant activities. The processes for the preparation of some of the derivatives of this series have particularly formed the subject of French Pat. No. 1,206,393 of Aug. 18, 1958 in the name of one of the inventors. Optionally substituted dihydroxylated coumarine compounds, such as 4,7-dihydroxycoumarine and 6,7-dihydroxycoumarine are also known, and the particularly choleretic properties of these compounds have been described in the special medicament French Pat. 2321 M, of Jan. 16, 1962, in the name of the applicants.

A new series of derivatives of coumarine, having very strong hypotensive activity, spasmolytic activity on the sphincter of Oddi and choleretic activity, have been found according to the invention, the said compounds, which can be substituted several times with a hydroxyl radical, forming the group constituted by 3-amino-8-hydroxycoumarine,
3,7-dihydroxycoumarine,
3,8-dihydroxycoumarine,
3-amino-6,7-dihydroxycoumarine,
3,7,8-trihydroxycoumarine,
3,5,7-trihydroxycoumarine,
3,6,7-trihydroxycoumarine,
3-ethyl-4,5,7-trihydroxycoumarine,
3-n-propyl-4,5,7-trihydroxycoumarine,
3-n-propyl-4,7,8-trihydroxycoumarine,
3-n-butyl-4,5,7-trihydroxycoumarine,
3-n-butyl-4,7,8-trihydroxycoumarine,
3-sec. butyl-4,5,7-trihydroxycoumarine,
3-phenyl-4,7,8-trihydroxycoumarine,
3-(naphthyl-1'-methyl)-4,5,7-trihydroxycoumarine,
3-(naphthyl-1'-methyl)-4,7,8-trihydroxycoumarine and
3-(2'-β-pyridylethyl)-4,5,7-trihydroxycoumarine.

The new compounds of this group come within the scope of the formula

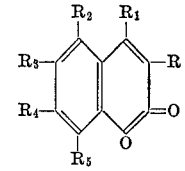

in which, depending on the compound, R is a hydroxy, alkyl, aralkyl, pyridyl alkyl, aryl or amino radical, $R_1$, $R_2$, $R_3$, $R_4$ and $R_5$ are hydrogen or a hydroxy radical, which compounds are easily prepared by different preferred methods, depending on the position of the substituents.

The compounds having a hydroxyl group in the 3-position can be obtained by a process consisting in the hydrolysis of the corresponding amino derivatives. This hydrolysis is effected either in alkali medium or in acid medium, and can be carried out under normal pressure or in an autoclave under a pressure of several atmospheres.

It is also possible to obtain certain compounds having a hydroxyl group in the 4-position by thermal condensation of a phenol and a substituted malonic ester.

The 3-amino-8-hydroxycoumarine is obtained by acid hydrolysis of 3-acetamido-8-acetoxycoumarine. This derivative is itself novel and as such forms part of the invention.

The hypotensive, spasmolytic and choleretic properties of the new hydroxyl derivatives of coumarine make them capable of therapeutic applications in the free state, or in the form of their addition salts with the organic or mineral bases, and, in the case of compounds having a primary amine function, in the form of their addition salts with the organic or mineral acids.

The oddian spasmolytic activity was determined on a guinea pig by the method described by Boissier and Chivot (Journal de Physiologie 51, 408, 1959) by intravenous administration in aqueous solution in the form of a sodium salt.

The standard chosen is hymecromone (4-methyl-7-hydroxycoumarine), to which was attributed the coefficient 100.

The activity coefficients are established by planimetry, so as to take into account the intensity and the duration of the spasmolytic response. Where this is possible, the product to be tested and the standard product were studied on the same animal.

The inhibiting activity of DOPA (3,4-dihydroxyphenylalanine) decarboxylase, was studied by the method of Sourkes, using the renal cortex of a guinea pig. The DOPA decarboxylase contained in this cortex, brought into the presence of a substrate which is DOPA, produces the Dopamine and $CO_2$; the manometric measurement in the Warburg apparatus of the release of $CO_2$ reflects the activity of the DOPA decarboxylase. If the substrate is mixed beforehand with an inhibitor of the DOPA decarboxylase, such as the methyl DOPA, which is the standard substance, the activity decreases and the release of $CO_2$ is less intense.

The results are expressed as a percentage of the activity of the methyl DOPA, to which has been attributed the coefficient 100.

In the following tables, there are given the coefficients of the compounds having simultaneously an inhibiting action on the DOPA decarboxylase (IDEC) and a spasmolytic activity (Table I), then the coefficients of the compounds having an inhibiting action on the DOPA decarboxylase, IDEC, alone (Table II), and finally those of the compounds having only an oddian spasmolytic activity (Table III).

TABLE I

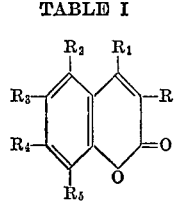

| Products | Coefficient of inhibiting activity of the DOPA decarboxylase | Coefficient of oddian spasmolytic activity |
|---|---|---|
| Methyldopa | 100 | |
| Hymecromone | | 100 |
| 3,7,8-trihydroxycoumarine ($R=R_4=R_5=OH$; $R_1=R_2=R_3=H$) | 112 | 61 |
| 3,5,7-trihydroxycoumarine ($R=R_2=R_4=OH$; $R_1=R_3=R_5=H$) | 61 | 177 |
| 3,6,7-trihydroxycoumarine ($R=R_3=R_4=OH$; $R_1=R_2=R_5=H$) | 58 | 101 |
| 3,7-dihydroxycoumarine ($R=R_4=OH$; $R_1=R_2=R_3=R_5=H$) | 31 | 103 |

Table II

Coefficient of inhibiting activity of the DOPA decarboxylase

Products:
Methyldopa _____ 100
3,8-dihydroxycoumarine
  ($R=R_5=OH$; $R_1=R_2=R_3=R_4=H$) _____ 50

Table III

Coefficient of oddian spasmolytic activity

Products:
Hymecromone _____ 100
3 - ethyl-4,5,7-trihydroxycoumarine ($R=C_2H_5$;
  $R_1=R_2=R_4=OH$; $R_3=R_5=H$) _____ 127
3-n-propyl-4,5,7-trihydroxycoumarine ($R=C_3H_7$
  (n); $R_1=R_2=R_4=OH$; $R_3=R_5=H$) ____ 246
3-n-butyl-4,5,7-trihydroxycoumarine ($R=C_4H_9$
  (n); $R_1=R_2=R_4=OH$; $R_3=R_5=H$) ____ 191
3-n-propyl-4,7,8-trihydroxycoumarine ($R=C_3H_7$
  (n); $R_1=R_4=R_5=OH$; $R_2=R_3=H$) ____ 72
3-n-butyl-4,7,8-trihydroxycoumarine ($R=C_4H_9$
  n; $R_1=R_5=OH$; $R_2=R_3=H$) _____ 72
3 - sec - butyl - 4,5,7 - trihydroxycoumarine
  $R=C_4H_9$ (sec.); $R_1=R_2=R_4=OH$;
  $R_3=R_5=H$) _____ 146
3-phenyl-4,7,8-trihydroxycoumarine ($R=C_6H_5$;
  $R_1=R_4=R_5=OH$; $R_2=R_3=H$) _____ 184
3-(naphthyl-1'-methyl) - 4,5,7 - trihydroxycoumarine ($R=$naphthyl-$CH_2$; $R_1=R_2=R_4=OH$;
  $R_3=R_5=H$) _____ 202
3-(naphthyl-1'-methyl) - 4,7,8 - trihydroxycoumarine $R=$naphthyl-$CH_2$; ($R_1=R_4=R_5=OH$;
  $R_2=R_3=H$) _____ 112

The clinical results which follow, relating to the hypotensive activity, were obtained with the compound for which, in the general formula, $R=R_4=R_5=OH$ and $R_1=R_2=R_3=H$, that is to say, the 3,7,8-trihydroxycoumarine, which compound is designated under the name LM 481. The tablets are titrated to 100 mg. of LM 481.

1st observation

Mrs. B., 54 years old.
Renal antecedents; left ventricular hypertrophy.
Treatment with 2 tablets per day of methyl DOPA.
Dopa: the tension is at 21/12.

This is substituted by LM 481. Treatment lasting 15 days with 2 tablets per day; the arterial tension changes to 16/8. There is observed a complete correction of the electrocardiographic disturbances of the repolarisation.

2nd observation

Mrs. D., 63 years old.
Malignant hypertension. Fundus oculi at stage 4, tension at 25/13 at the entry. The arterial tension changes to 21/12 with a salt-free diet plus hydergine plus papaverine. Three tablets per day of LM 481 are added without any change in the treatment. The arterial tension changes to 10/12. Excellent observation.

3rd observation

Hypertension at 23/13. Under reserpine diet, complete arythmia, the tension changes to 20/11. Relays with 2 tablets per day of LM 481. The arterial tension falls to 13/8. Excellent tolerance.

The pharmaceutical compositions, containing as active principle a hydroxy coumarine according to the present invention, can be in the form of compressed pills, tablets, gelatine capsules, sugar-coated pills, aqueous suspension, injectable solutions, syrups and the like.

A formula of a compressed pill is given below as a non-limiting example:

|  | Mg. |
|---|---|
| Active principle | 100 |
| Lactose | 46 |
| Royalgine | 10 |
| Starch | 10 |
| Talcum | 20 |
| Potato starch | 10 |
| Magnesium stearate | 4 |

These pharmaceutical compositions, containing a hydroxycoumarine according to the invention as active principle and a solid or liquid pharmaceutical excipient, support or diluent which is physiologically acceptable, permit the daily administration of doses of active principle which are between approximately 50 mg. and 1000 mg.

Examples of the preparation of the compounds according to the invention are given below in non-limiting manner.

EXAMPLE 1

3,7-dihydroxycoumarine

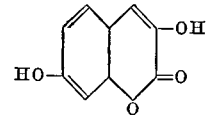

8.6 g. (0.058 mol) of 3-amino-7-hydroxycoumarine (Boll. Chim. Farm 97, 592–1918) are dissolved in 192 ml. of crystallisable acetic acid. 210 ml. of 3 N HCl are added and heating takes place for 6 hours under reflux. After cooling, the coloured precipitate which is obtained is hydroextracted, washed with cold water until neutral and then recrystallised from 50% aqueous ethanol.

5.1 g. of 3,7-dihydroxycoumarine are obtained. M.P.= 268° C. (capillary tube—Gallenkamp apparatus). By concentrating the reaction mother liquors and subjecting the residue to a fresh hydrolysis, another 0.8 g. of product are recovered, i.e. a yield of 69%.

The product is dissolved very easily to the sodium salt form in a N/10 sodium hydroxide solution.

Gravimetric analysis $C_9H_6O_4$—mol. weight=178.14.
Calculated (percent): C, 60.68; H, 3.39. Found (percent): C, 60.54; 3.51.

EXAMPLE 2

8-hydroxy-3-aminocoumarine

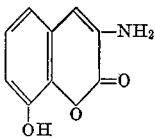

(a) Preparation of 8-acetoxy-3-acetamidocoumarine

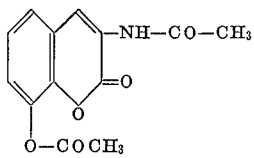

The following mixture is heated for 1 hour under reflux; 4.45 g. (0.032 mol) of 2,3 - dihydroxybenzaldehyde (M.P.=1.06° C.), 3.9 g. (0.033 mol) of acetylglycocol (M.P.=210° C.), 6.5 g. (0.08 mol) of melted sodium acetate and 25 ml. of acetic anhydride.

On cooling, the brown liquor which is obtained solidifies and, after crushing, it is washed with 150 ml. of water, and then in 60 ml. of hot methanol. The insoluble product is hydroextracted and recrystallised from ethanol. 2.2 g. of a compound melting at 211° C. (Kofler bench) are obtained. The washing methanol allows another small quantity of 8-acetoxy-3-acetamidocoumarine to crystallise at ambient temperature, and this is also recrystallised from ethanol, giving a total yield of 2.8 g.

Gravimetric analysis $C_{13}H_{11}NO_5$—mol. weight=261.23.

Calculated (percent): C, 59.77; H, 4.25; N, 5.36. Found (percent): C, 59.61; H, 4.34; N, 5.54.

This compound is novel and forms part of the invention.

(b) 8-hydroxy-3-aminocoumarine 2.6 g. (0.01 mol) of 8-acetoxy-3-acetamidocoumarine are brought for 5 minutes to boiling in 150 ml. of 3 N HCl. The yellow liquor obtained is filtered in order to eliminate a slight quantity of insoluble substance. The acid liquor allows the precipitation, by cooling, of a mixture containing 3-amino - 8 - hydroxycoumarine hydrochloride and a small quantity of 3,8 - dihydroxycoumarine.

The precipitate is then washed with boiling acetone and the insoluble substance, formed solely by the 3-amino-8-hydroxycoumarine hydrochloride is neutralised.

For doing this, the compound is placed in suspension in 20 ml. of water and neutralised with 5% solution of sodium bicarbonate.

A whitish solid is obtained, and this is hydroextracted, washed with cold water and recrystalised from ethanol. The 3-amino - 8 - hydroxycoumarine which is obtained (0.95 g.) amounts to 58%, and melts at 196–198° C. (capillary tube).

Gravimetric analysis $C_9H_7NO_3$—mol. weight=177.15.

Calculated (percent): C, 61.02; H, 3.98; N, 7.91. Found (percent): C, 59.99; H, 3.87; N, 7.98.

EXAMPLE 3

3,8-dihydroxycoumarine

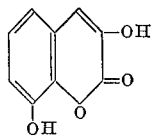

0.4 g. (0.0022 mol) of 3-amino - 8 - hydroxycoumarine is heated under reflux for 1 hour in 25 ml. of 3 N HCl and 1 ml. of acetic acid. After cooling, light yellow needles of 3,8-dihydroxycoumarine are obtained, the melting point of which is 216–218° C. (capillary tube), this not being raised by a fresh recrystallisation from boiling water. Yield=0.3 g. (75%). The compound gives a blue-coloured reaction with $FeCl_3$ in alcoholic medium, while the 3-amino - 8 - hydroxycoumarine does not give this reaction.

Gravimetric analysis $C_9H_6O_4$—mol. weight=178.14.

Calculated (percent): C, 60.68; H, 3.39. Found (percent): C, 60.52; H, 3.41.

EXAMPLE 4

3,7,8-trihydroxycoumarine

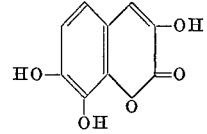

1.93 g. (0.01 mol) of 3-amino - 7,8 - dihydroxycoumarine (Boll. Chim. Farm. 97, 592–1958) are added to a boiling sodium hydroxide solution containing 2 g. of NaOH in 90 ml. of water. The substance is allowed to reflux for 10 minutes, during which period a strong release of $NH_3$ is observed. After cooling, the liquor obtained is poured into a mixture of 10 ml. of 40% HCl and 90 g. of crushed ice. The product is extracted from the aqueous solution obtained by washing three times with 50 ml. of ethyl acetate. After decantation, the three extracts are dried over sodium sulphate and the solvent evaporated in vacuo. The residue is taken up in a minimum quantity of boiling water (5 ml.) which, after a few hours, allows the crystallisation of 0.8 g. (41%) of 3,7,8-trihydroxycoumarine, melting at 275–277° C. with decomposition (capillary tube).

Gravimetric analysis $C_9H_6O_5$—mol. weight=194.14.

Calculated (percent): C, 55.68; H, 3.12; O, 41.21. Found (percent): C, 55.62; H, 3.17; O, 41.40.

EXAMPLE 5

3,5,7-trihydroxycoumarine

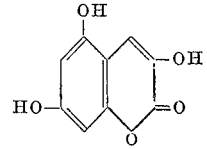

First method.—1 g. (0.005 mol) of 5,7 - dihydroxy-3-aminocoumarine (Boll. Chim. Farm. 97, 592–1958) is heated under reflux in a mixture of 40 ml. of crystallisable $CH_3COOH$ and 25 ml. of 3 N HCl. This heating is maintained for 4½ hours and then evaporation to dryness in vacuo is carried out. The residue is recrystallised from boiling water. 0.2 g. of 3,5,7-trihydroxycoumarine are obtained, melting at 276° C. (capillary tube).

Second method.—1.93 g. (0.01 mol) of 5,7-dihydroxy-3-aminocoumarine are heated for 5 minutes under reflux in a solution of 2 g. of NaOH in 18 ml. of water.

Extraction is carried out with ethyl acetate and then, after drying of the solution and evaporation to dryness of the solvent, the substance is recrystallised from boiling water. The product crystallises as fine needles melting at 275–276° C. (capillary tube).

Gravimetric analysis $C_9H_6O_5$—mol. weight=194.14.

Calculated (percent): C, 55.68; H, 3.12; O, 41.21. Found (percent): C, 55.49; H, 3.22; O, 41.04.

EXAMPLE 6

6,7-dihydroxy-3-aminocoumarine

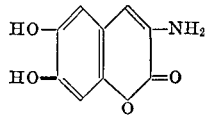

13.2 g. (0.085 mol) of 2,4,5-trihydroxybenzaldehyde (M.P.=226° C.), 10.29 g. (0.087 mol) of acetyl glycol (M.P.=210° C.) and 15.4 g. of melted sodium acetate are refluxed while stirring in 66 ml. of acetic anhydride. The reflux is maintained for 1 hour. After cooling, the brown solution which is obtained solidifies. The solid is washed with 5 volumes of water at 50° C. and then with 130 ml. of hot methanol. After hydroextraction, the product is recrystallised from a large volume of ethanol. There are obtained 11 g. of 3-acetamido-6,7-diacetoxy-coumarine melting at 235–236° C. (Kofler bench).

4.15 g. of this compound are hydrolysed for 10 minutes in 200 ml. of boiling 3 N HCl and then neutralised with a concentrated solution of HNaCO$_3$. 2.3 g. (i.e. 92%) of 3-amino-6,7-dihydroxycoumarine are obtained, melting at 258–260° C. with decomposition (capillary tube).

Gravimetric analysis $C_9H_7NO_4$—mol. weight=193.14.
Calculated (percent): C, 55.98; H, 3.65; N, 7.25. Found (percent): C, 55.92; H, 3.74; N, 7.18.

EXAMPLE 7

3,6,7-trihydroxycoumarine

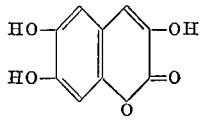

0.96 g. (0.005 mol) of 3-amino-6,7-dihydroxycoumarine (obtained in Example 4) are dissolved in 40 ml. of crystallisable acetic acid. 25 ml. of 3 N HCl are added and the mixture refluxed for 4 hours. The liquor is evaporated to dryness in vacuo and then recrystallised twice from boiling water. 0.25 g. of 3,6,7-trihydroxycoumarine are obtained, melting at 272–274° C. (capillary tube).

Like the preceding compounds, the product is very soluble in alkali solutions.

Gravimetric analysis $C_9H_6O_5$—mol. weight=194.14.
Calculated (percent): C, 55.68; H, 3.12. Found: C, 55.89; H, 3.37.

EXAMPLE 8

3-ethyl-4,5,7-trihydroxycoumarine

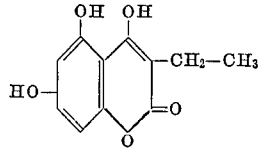

10.8 g. (0.066 mol) of phloroglucinol (2H$_2$O) are heated to 210–215° C. with 12.5 g. (0.066 mol) of ethyl ethyl malonate, while distilling the reactional alcohol and also the water originating from the phloroglucinol. The use of anhydrous phloroglucinol slightly increases the yield of the reaction (41%). On the other hand, an excess of phloroglucinol with respect to the malonate reduces the yields. The heating is maintained for 3 hours. The resinous product obtained is taken up in a 5% bicarbonate solution and the solution obtained is washed with ether.

The aqueous phase is carefully acidified. The yellowish precipitate as obtained is hydroextracted and recrystallised twice from a mixture of acetone and water. The 3-ethyl-4,5,7-trihydroxycoumarine is obtained with a yield of 33%, this melting at 267° C. on a heating stage microscope. (As the product sublimes, the melting point is taken between two glass sheets.)

Gravimetric analysis $C_{11}H_{10}O_5$—mol. weight=222.19.
Calculated (percent): C, 59.28; H, 4.70. Found (percent): C, 59.46; H, 4.54.

EXAMPLE 9

3-n-propyl-4,5,7-trihydroxycoumarine

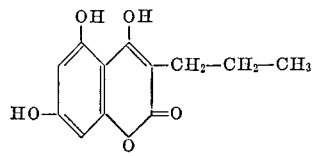

A mixture of 13.5 g. (0.066 mol) of ethyl-n-propyl-malonate (B.P.=100–103° C. at 16 millibars—$N_D^{20}$= 1.4198) with 10.8 g. (0.066 mol) of dihydrated phloroglucinol is heated for 1 hour at 220° C. while distilling the reactional alcohol. The resinous product is dissolved in a bicarbonate solution and then, after washing with ether, it is acidified with HCl. The product which precipitates is hydroextracted and then recrystallised from aqueous ethanol.

5.3 g. (34%) of 3-n-propyl-4,5,7-trihydroxycoumarine are obtained. The product melts at 242° C. (sublimation) on a heating stage microscope.

The sodium salt is obtained on the hydroxy in the 4-position, by causing the 3-propyl-4,5,7-trihydroxycoumarine to react in aqueous medium with the calculated quantity of sodium bicarbonate. The yellow solution obtained is washed with ether and then concentrated to dryness. The sodium salt crystallises by washing the oil which is obtained in ether.

This salt has very good solubility in water and this process can be applied to all the compounds of the invention having an OH in the 4-position, the other phenolic hydroxyls not reacting in the presence of sodium bicarbonate.

Gravimetric analysis $C_{12}H_{12}O_5$—mol. weight=236.22.
Calculated (percent): C, 61.01; H, 5.12. Found (percent): C, 60.94; H, 5.21.

EXAMPLE 10

3-n-propyl-4,7,8-trihydroxycoumarine

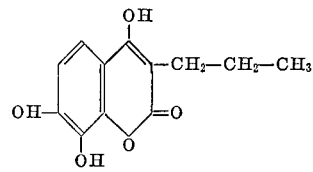

A mixture of 8.4 g. (0.066 mol) of pyrogallol and 13.5 g. (0.066 mol) of ethyl-n-propyl malonate is heated for 5 hours at 250° C. while distilling the reactional alcohol. The brown resin obtained is dissolved in a cold 5% bicarbonate solution. After filtration of a little insoluble substance, the solution is acidified with HCl. The hydroextracted precipitate is recrystallised from boiling water. The product crystallises as fine white crystals melting at 175° C. (microscope).

Gravimetric analysis $C_{12}H_{12}O_5$—mol. weight=236.22.
Calculated (percent): C, 61.01; H, 5.12. Found (percent): C, 61.08; H, 5.31.

EXAMPLE 11

3-n-butyl-4,5,7-trihydroxycoumarine

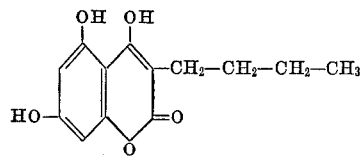

8.4 g. (0.066 mol) of anhydrous phloroglucinol and 14.4 g. (0.066 mol) of ethyl-n-butyl malonate are heated to 220° C. for 1 hour, while distilling the reactional alcohol. The resinous product is dissolved in the bicarbonate, acidified, hydroextracted and recrystallised from 20% aqueous alcohol. 6.9 g. (41.5%) of compound melting at 230° (heating stage microscope) are obtained.

Gravimetric analysis $C_{13}H_{14}O_5$—mol. weight=250.25.
Calculated (percent): C, 62.39; H, 5.64; Found (percent): C, 62.21; H, 5.70.

EXAMPLE 12

3-n-butyl-4,7,8-trihydroxycoumarine

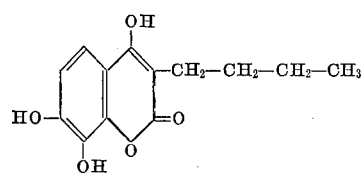

12.6 g. (0.1 mol) of pyrogallol and 21.6 g. (0.1 mol) of ethyl-n-butyl malonate are heated for 2 hours at 250° C., while distilling the reactional alcohol. The resinous mass obtained is taken up in a 5% aqueous solution of sodium bicarbonate, and the product obtained after acidification is hydroextracted and recrystallised twice from boiling water.

It is obtained as hygroscopic nacreous scales melting at 168° C. (microscope).

Gravimetric analysis $C_{13}H_{14}O_5$—mol. weight=250.25.
Calculated (percent): C, 62.39; H, 5.64. Found (percent): C, 62.24; H, 5.77.

EXAMPLE 13

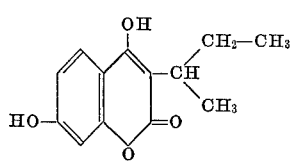

10.8 g. (0.05 mol) of ethyl-sec.-butyl malonate (Org. Synth. Coll. vol. No. 3, page 495) B.P.=110–113° C/14 millibars and 8.1 g. (0.05 mol) of phloroglucinol are heated for 4 hours at 230° C., while distilling the reactional alcohol. The resinous mass is taken up in a $HNaCO_3$ solution. This solution is filtered and then washed with ether. After acidification, the precipitate obtained is recrystallised from boiling water and it melts at 201–202° C. (microscope).

Gravimetric analysis $C_{13}H_{14}O_5$—mol. weight=250.25.
Calculated (percent): C, 62.39; H, 5.64. Found (percent): C, 62.30; H, 5.75.

EXAMPLE 14

3-phenyl-4,7,8-trihydroxycoumarine

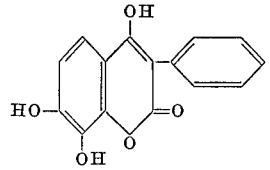

2.52 g. (0.02 mol) of pyrogallol and 4.72 g. (0.02 mol) of ethyl phenyl malonate are heated for 3 hours at 220° C. while distilling the reactional alcohol.

The resinous mass obtained after cooling is dissolved in a sodium bicarbonate solution and then the solution is washed with ether and acidified with HCl. The oily product which is obtained crystallises slowly on standing. After hydroextraction, it is recrystallised from boiling water. Its melting point is 270–272° C. (microscope).

Gravimetric analysis $C_{15}H_{10}O_5$—mol. weight=270.23.
Calculated (percent): C, 66.67; H, 3.73. Found (percent): C, 66.56; H, 3.93.

EXAMPLE 15

3-(1'-methylnaphthyl)-4,5,7-trihydroxycoumarine

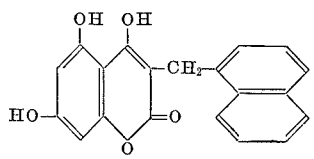

A mixture of 10.8 g. (0.066 mol) of phloroglucinol, $2H_2O$, and 20 g. (0.066 mol) of ethyl-α-naphthyl methyl malonate—B.P.=171° C./2 millibars [Louis F. Fieser—J. Am. Chim. Soc. 2335–41 (1940)] is heated for 1 hour at 220° C. while distilling the alcohol formed in the reaction.

The resin obtained on completion of the reaction is taken up in bicarbonate by slightly warming the solution. After cooling, the substance is washed with ether and then acidified with HCl. The precipitate is hydroextracted, washed with cold water and recrystallised from a 50% acetone-water mixture. The compound obtained melts at 280° C. (microscope)—yield 38%.

Gravimetric analysis $C_{20}H_{14}O_5$—mol. weight=334.31.
Calculated (percent): C, 71.85; H, 4.22. Found (percent): C, 71.70; H, 4.33.

EXAMPLE 16

3-(naphthyl-1'-methyl)-4,7,8-trihydroxycoumarine

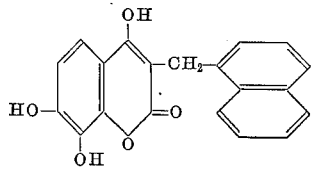

8.4 g. (0.066 mol) of pyrogallol and 20 g. (0.066 mol) of ethyl-α-naphthyl methyl malonate are heated for 3 hours at 250–260° C. while distilling the reactional alcohol. The reaction mass is taken up in a bicarbonate solution, filtered and washed with ether. The product obtained, after acidification, is hydroextracted, washed with cold water and recrystallised from a mixture of acetone and water.

After being recrystallised twice, the product melts at 272° C. (microscope) and is analytically pure, after drying in vacuo in the presence of $P_2O_5$.

Gravimetric analysis $C_{20}H_{14}O_5$—mol. weight=334.31.

Calculated (percent): C, 71.88; H, 4.22. Found (percent): C, 71.85; H, 4.35.

EXAMPLE 17

3-(β-2'-pyridylethyl)-4,5,7-trihydroxycoumarine

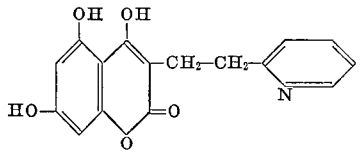

A mixture of 2.65 g. (0.01 mol) of ethyl-2-β-pyridyl ethyl malonate (J. Chem. Soc. 71, page 882), 1.62 g. (0.01 mol) of crystallised phloroglucinol and 5 g. of diphenylether is heated at 150° C./15 millibars. After heating for 8 hours, washing with hexane is carried out to remove the diphenyl oxide, followed by washing with ether. The product is then recrystallised from dimethylformamide and washed with alcohol. It melts at 288° C. (capillary tube) and is insoluble in water and in hydrochloric acid medium.

Gravimetric analysis $C_{16}H_{13}NO_5$—mol. weight=299.27.

Calculated (percent): C, 64.21; H, 4.38; N, 4.68. Found (percent): C, 64.48; H, 4.60; N, 4.80.

What we claim is:

1. A 3-hydroxycoumarine of the group consisting of 3,7,8-trihydroxycoumarine; 3,5,7 - trihydroxycoumarine; 3,6,7-trihydroxycoumarine, and their salts of an alkali metal.

References Cited

Guenter, Chem. Abstracts, vol. 63, cols. 14, 801–14, 802, November 1965.

Bose et al., Chem. Abstracts, vol. 54, cols. 24, 690, November 1960.

Chem. Abstracts, vol. 52, cols. 4613–4614, March 1958.

Trivedi, Chem. Abstracts, vol. 57, cols. 16, 537–16, 538, December 1962.

Mentzer et al., Chem. Abstracts, vol. 45, col. 10245, November 1951.

Bickoff et al., Archives of Biochemistry and Biophysics, vol. 88, pp. 262–266 (1960).

ALAN L. ROTMAN, Primary Examiner

U.S. Cl. X.R.

260—295; 424—266, 279

UNITED STATES PATENT OFFICE
CERTIFICATE OF CORRECTION

Patent No. 3,585,214  Dated June 15, 1971

Inventor(s) Eugene BOSCHETTI et al.

It is certified that error appears in the above-identified patent and that said Letters Patent are hereby corrected as shown below:

Col. 4, line 56, change "0.058" to --0.048--

Col. 4, line 57, change "1918" to --1958--

Col. 5, line 19, change "1.06°" to --106°--

Col. 8, line 22, change "$N_D^{20}$" to --$n_D^{20}$--

Col. 9, the line following "Example 13" insert
--3-sec.-butyl-4,5,7-trihydroxycoumarine--

Signed and sealed this 14th day of December 1971.

(SEAL)
Attest:

EDWARD M. FLETCHER, JR.
Attesting Officer

ROBERT GOTTSCHALK
Acting Commissioner of Patents